(12) United States Patent
Ikenaka

(10) Patent No.: US 7,269,119 B2
(45) Date of Patent: Sep. 11, 2007

(54) OPTICAL PICK-UP APPARATUS

(75) Inventor: Kiyono Ikenaka, Hino (JP)

(73) Assignee: Konica Minolta Opto, Inc., Tokyo (JP)

(*) Notice: Subject to any disclaimer, the term of this patent is extended or adjusted under 35 U.S.C. 154(b) by 523 days.

(21) Appl. No.: 10/913,460

(22) Filed: Aug. 9, 2004

(65) Prior Publication Data

US 2005/0036430 A1  Feb. 17, 2005

(30) Foreign Application Priority Data

Aug. 12, 2003 (JP) ............................. 2003-292122

(51) Int. Cl.
  *G11B 7/00* (2006.01)
(52) U.S. Cl. .............................. 369/112.01; 369/112.03
(58) Field of Classification Search ........... 369/112.01, 369/112.03, 112.04, 44.37, 112.23, 112.07, 369/112.12, 112.08
  See application file for complete search history.

(56) References Cited

U.S. PATENT DOCUMENTS 6,870,805 B1 * 3/2005 Arai et al. ............. 369/112.07

* cited by examiner

*Primary Examiner*—Nabil Hindi
(74) *Attorney, Agent, or Firm*—Finnegan, Henderson, Farabow, Garrett & Dunner, L.L.P.

(57) ABSTRACT

An optical pick-up apparatus comprising: first, second and third light sources for recording and/or reproducing respectively first, second and third optical information recording material; an objective optical element having a diffractive structure on an optical surface of the objective lens, wherein a diffraction efficiency E1 of a first primary diffractive ray is not less than 90%, a diffraction order n1 of the first primary diffractive ray is an odd number, and an output power PW3, which is an output power of the third light source when the third light source emits the third light flux, is emitted is greater than an output power PW1, which is an output power of the first light source when the first light source emits the first light flux.

21 Claims, 5 Drawing Sheets

WAVE-FRONT ABERRATION AND DIFFRACTION
EFFICIENCY FOR EACH FORMAT

|  | AOD | DVD | CD |
|---|---|---|---|
| WAVE-FRONT ABERRATION | 0.03 $\lambda$ rms | 0.011 $\lambda$ rms | 0.045 $\lambda$ rms |
| DIFFRACTION EFFICIENCY | 99% | 91% | 46% |

OPTICAL PICK-UP APPARATUS

RELATED APPLICATION

This application is based on Japanese patent application No. 2003-292122 filed in Japan, the entire content of which is hereby incorporated by reference.

TECHNICAL FIELD

The present invention relates to an optical pick-up apparatus.

TECHNICAL BACKGROUND

Recently, the research and development of so-called high density optical disk in which a recording density of an optical information recording medium (optical disk) is increased by using a blue laser light of wavelength of about 400 nm and a storage capacity is increased, are advanced.

As a standard of the high density optical disk, for example, a standard in which an image side numerical aperture (NA) of an objective lens is about 0.85, a protective substrate thickness is about 0.1 mm, or a standard in which NA and the protective substrate thickness are controlled to about 0.65 and 0.6 mm, which are same degree as those of the conventional DVD (Digital Versatile Disk), is well-known. In the following description, the high density optical disk in which NA is about 0.65, and the protective substrate thickness is about 0.6 mm, is expressed as "HD-DVD (High Density DVD)".

Various technologies relating to the optical pick-up apparatus having the interchangeability of such a high density optical disk with the optical disk such as DVD or CD (Compact Disc) which is conventionally widely used, are proposed.

Hereupon, wavelengths of light fluxes used for HD-DVD/DVD/CD, $\lambda 1/\lambda 2/\lambda 3$ are respectively about 400 nm/650 nm/780 nm, and protective substrate thickness t1/t2/t3 are respectively about 0.6 mm/0.6 mm/1.2 mm.

Then, in order to attain the compatibility among 3 kinds of optical disks of HD-DVD/DVD/CD, it is necessary that, while the light amount of the light flux used for each of optical disks is preserved, the spherical aberration generated due to the difference of the wavelengths or protective substrate thickness is compensated, and a technology by which the diffractive structure is provided on the optical surface of the optical element constituting the optical pick-up apparatus, is disclosed in, for example, Japanese Un-examined Patent Application Publication No. 2002-298422.

Ordinarily, because, for recording and/or representing HD-DVD, more light amount is required than for CD or DVD, there are many cases in which, in the diffraction light of wavelength $\lambda 1$, the diffraction order which is the maximum diffraction efficiency, and the blazed wavelength are selected.

In contrast to that, on DVD, because the protective substrate thickness is the same as HD-DVD (t1=t2=0.6 mm), the spherical aberration (A) is generated due to only a case where the wavelength is different. When this spherical aberration (A) is going to be compensated by using the diffraction effect, it is compensated by the difference of wavelength x diffraction order between HD-DVD and DVD.

In addition to that, when the transposition with CD is also considered, due to a case where the wavelength $\lambda 1$ of the light flux for HD-DVD is about a half of wavelength $\lambda 3$ of the light flux for CD, for example, when n-order diffraction light of the wavelength $\lambda 1$ has the maximum diffraction efficiency, (n/2)-order diffraction light of the light flux of the wavelength $\lambda 3$ has the maximum diffraction efficiency. Then, when the compatibility is attained by the ratio of the diffraction order of this wavelength $\lambda 1$ and the wavelength $\lambda 3$ (2:1), in CD, the diffraction order light of the wavelength $\lambda 3$ has the maximum diffraction efficiency, on the one hand, the spherical aberration (B) (B>A) generated due to a case where the protective substrate thickness is different between HD-DVD and CD, can not be corrected by the difference of wavelength x diffraction order between HD-DVD and CD.

As described above, in the production of the optical pick-up apparatus having the interchangeability among 3 kinds of optical disks of HD-DVD/DVD/CD, there is a problem that the compatibility of the securement of the light amount of each light flux with the correction of spherical aberration is difficult. Also in the above-described Patent Document, the efficiency of 3rd order light of the high density optical disk (HD-DVD) using the light flux near the wavelength 400 nm, is about 73%, which is a value in which it can not always be said that it is sufficient for using for recording of the information.

SUMMARY

An aspect of the present invention is one which considers the above-described problem, and to provide an optical pick-up apparatus having the compatibility of HD-DVD with the other 2 kinds of optical information recording media, and in which both of good light efficiency and the correction of spherical aberration can be attained.

The above-described object can be attained by the following embodiments.

The first embodiment of the present invention is an optical pick-up apparatus comprising: a first light source emitting a first light flux having a wavelength of $\lambda 1$, the first light flux being utilized for recording information on and/or reproducing from a first optical information recording medium including a first protective substrate having a thickness of t1; a second light source emitting a second light flux having a wavelength of $\lambda 2$, which is greater than $\lambda 1$, the second light flux being utilized for recording information on and/or reproducing from a second optical information recording medium including a second protective substrate having a thickness of t2, which satisfies $0.8t1 \leq t2 \leq 1.2t1$; a third light source emitting a third light flux having a wavelength of $\lambda 3$, which satisfies $1.6\lambda 1 \leq \lambda 3 \leq 2.2\lambda 1$ and $\lambda 3 > \lambda 2$, the third light flux being utilized for recording information on and/or reproducing from a third optical information recording medium including a third protective substrate having a thickness of t3, which $1.9t1 \leq t3 \leq 2.1t1$; and an objective optical element on at least one of whose optical surfaces, the diffractive structure is formed. The objective optical element is installed on optical paths of the first light flux, the second light flux and the third light flux.

Further, in the optical pick-up apparatus, a diffraction efficiency E1 of a first primary diffractive ray, which has the greatest diffraction efficiency among diffractive rays generated by the first light flux passing through the diffractive structure, is not less than 90%, and a diffraction order n1 of the first primary diffractive ray is an odd number. Still further, in the optical pick-up apparatus, an output power PW3 of the third light source is greater than an output power PW1 of the first light source.

According to the above first embodiment, when the diffraction efficiency E1 of the primary diffracted ray of the light flux of wavelength $\lambda 1$ is 90% or more, the light amount can be preserved, and when the diffraction order of the diffractive ray having the maximum diffraction efficiency in the diffracted rays of the first light flux passing the diffractive structure is made odd number, the spherical aberration correction on the third optical information recording medium (for example, CD) side using the diffraction effect can be conducted.

Further, while the spherical aberration of the light flux of wavelength $\lambda 3$ is controlled to a degree in which practically a trouble is not generated, the sufficient light amount can be preserved, and the light flux of wavelength $\lambda 3$ can be used for the recording and/or reproducing of the information to the third optical information recording medium.

DETAILED DESCRIPTION OF THE INVENTION

In the present invention, an objective optical element represents an optical element arranged on most optical disc side in an optical pick-up apparatus. Hereinafter, there is also a case where the objective optical element is written as an objective lens. Further, the diffractive structure in the present invention is not particularly limited, and represents a structure by which the diffraction phenomenon of the light is generated.

In the optical pick-up apparatus of the present invention, it is preferable that optical system magnifications m1-m3 of the objective optical element to each light flux of the wavelengths $\lambda 1$-$\lambda 3$ are almost equal. In the present invention, when the optical system magnifications m1-m3 are almost equal, it means that, in m1-m3, the difference between the largest magnification and the other 2 magnifications is not larger than ±10%, and further, it is preferable that it is not larger than 5%. However, in m1-m3, when at least one magnification is 0, the other 2 magnifications are more than−0.01, and less than +0.01.

In the optical pick-up apparatus of the present invention, it is preferable that the maximum diffraction efficiency E3 of the diffraction light generated when the phase difference is given to the light flux of the wavelength $\lambda 3$ by the diffractive structure, satisfies 30%≦E3≦80%. Further, it is preferable that the diffraction efficiency E3 satisfies 30%≦E3≦60%.

In the optical pick-up apparatus of the present invention, it is preferable that the diffraction order n3 of the diffraction light having the diffraction efficiency E3 satisfies n3≧n½.

In the optical pick-up apparatus of the present invention, it is preferable that it satisfies n1=3 and n3=2, or n1=5 and n3=2.

In the optical pick-up apparatus of the present invention, it is preferable that the focal distance f1 to the light flux of wavelength $\lambda 1$ of the objective optical element satisfies 2 mm≦f1≦3.5 mm.

According to such a structure, the size reduction of the optical pick-up apparatus can be realized.

In the optical pick-up apparatus of the present invention, it is preferable that the numerical aperture NA3 of the light converging spot by the light flux of wavelength $\lambda 3$ satisfies 0.44≦NA3≦0.49.

In the optical pick-up apparatus of the present invention, it is preferable that a sectional shape of the diffractive structure is saw-toothed shape and the diffractive structure consists of a plurality of diffraction ring-shaped zones around the optical axis, and it is more preferable that number of the diffraction ring-shaped zones formed in a region through which the light flux of the wavelength $\lambda 1$ passes is within a range of 20-100.

Further, in the optical pick-up apparatus of the present invention, it is also a preferable mode that the diffractive structure consists of a plurality of ring-shaped zone surfaces around the optical axis, and each of ring-shaped zone surfaces has a plurality of step structures which continue through a step difference approximately parallel to the optical axis, and it is more preferable that number of the ring-shaped zone surfaces formed in the region through which the light flux of the wavelength $\lambda 1$ passes is within a range of 20-100.

In the present invention, "a step difference almost parallel to the optical axis" means that an angle from the optical axis is not larger than ±10°, further, it is preferable that it is not larger than ±5°.

In the optical pick-up apparatus of the present invention, it is preferable that it is provided with at least one collimator, and a focal distance fc1 to the light flux of wavelength $\lambda 1$ and a focal distance fc3 to the light flux of wavelength $\lambda 3$ of the collimator satisfy fc1>fc3.

According to such a mode, when a focal distance fc1 to the light flux of wavelength $\lambda 1$ and a focal distance fc3 to the light flux of wavelength $\lambda 3$ of the collimator satisfy fc1>fc3, the distance from the third light source to the collimator is shorter than the distance from the first light source to the collimator, and an amount of the light flux of wavelength $\lambda 3$ is larger than that of the light flux of wavelength $\lambda 1$ passing the collimator. Accordingly, a sufficient light amount can be secured for the light flux of wavelength $\lambda 3$.

In the optical pick-up apparatus of the present invention, it is preferable that the device is provided with at least one collimator, and a focal distance fc1 to the light flux of wavelength $\lambda 1$ and a focal distance fc2 to the light flux of wavelength $\lambda 2$ of the collimator satisfy fc1>fc2.

According to such a mode, when a focal distance fc1 to the light flux of wavelength $\lambda 1$ and a focal distance fc2 to the light flux of wavelength $\lambda 2$ of the collimator satisfy fc1 >fc2, a distance from the second light source to the collimator is shorter than a distance from the first light source to the collimator, and an amount of the light flux of wavelength $\lambda 2$ is larger than that of the light flux of wavelength $\lambda 1$ passing the collimator. Accordingly, a sufficient light amount can be preserved for the light flux of wavelength $\lambda 2$.

In the optical pick-up apparatus of the present invention, it is preferable that it is provided with at least one collimator, and an aberration variation amount at the same position in the optical axis direction in before and after the wavelength variation in the case where the wavelength of the light flux projected from the first light source varies from $\lambda 1$ by 1 nm, is corrected lower than 0.03 $\lambda$rms.

In the optical pick-up apparatus of the present invention, it is preferable that the collimator has a diffractive structure whose sectional shape is saw-toothed shape, and which is composed of a plurality of diffraction ring-shaped zones around the optical axis, and it is more preferable that number of the diffraction ring-shaped zones formed in a region through which the light flux of wavelength λ1 passes is within a range of 50-100.

Further, in the optical pick-up apparatus of the present invention, it is preferable that the collimator has a diffractive structure which is composed of a plurality of ring-shaped zone surfaces around the optical axis, on at least one optical surface, and each of the ring-shaped zone surfaces has a diffractive structure having a plurality of step difference structures continuing through a step difference almost parallel to the optical axis, and it is more preferable that number of ring-shaped zone surfaces formed in a region through which the light flux of the wavelength λ1 passes is within a range of 20-100.

It is preferable that the optical pick-up apparatus of the present invention has at least one collimator and the light flux of wavelength λ1 and the light flux of wavelength λ2 pass together the same collimator.

According to such a mode, when a collimator is commonly used, the number of parts of the optical elements constituting the optical pick-up apparatus can be reduced.

In the optical pick-up apparatus of the present invention, is preferable that the objective optical element is formed of plastic.

According to such a mode, the production cost of the objective optical element can be suppressed.

It is preferable that the optical pick-up apparatus of the present invention has at least one collimator and the collimator is formed of plastic.

According to such a mode, the production cost of the collimator can be suppressed.

In the optical pick-up apparatus of the present invention, it is preferable that the optical system magnifications m1-m3 are almost 0.

PREFERRED EMBODIMENTS OF THE INVENTION

Hereinafter, referring to the drawings, the best embodiment for conducting the present invention will be described in detail.

Figure 1:
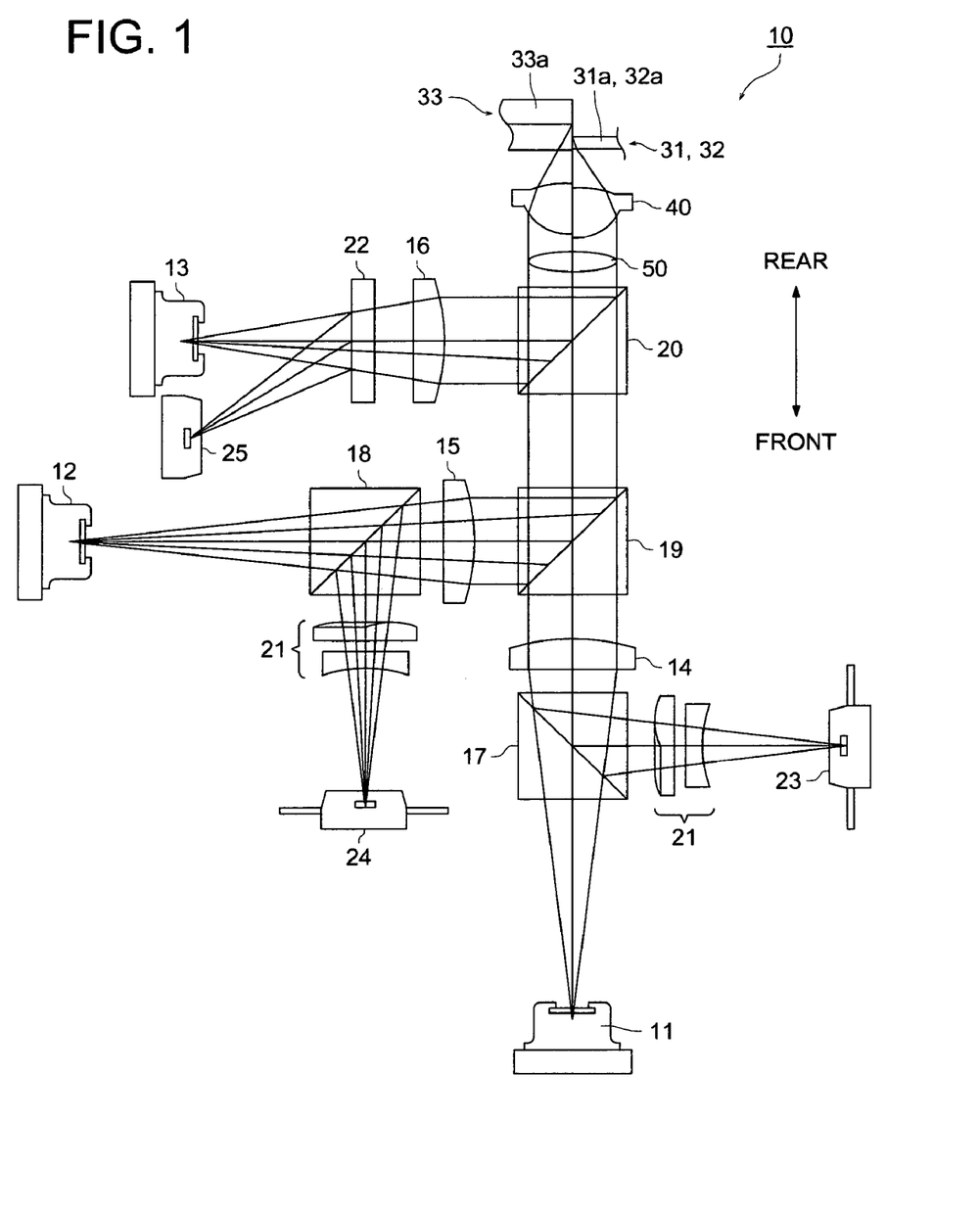
FIG. 1 is a plan view showing a structure of an optical pick-up apparatus

As shown in FIG. 1, in the present embodiment, an optical pick-up apparatus 10 has the first to third light sources 11-13 which emit each light flux of a wavelength λ1 (407 nm), wavelength λ2 (655 nm) and wavelength λ3 (785 nm).

Then, by using each of these light fluxes, the optical pick-up apparatus 10 is structured in such a manner that the recording and/or reproducing is conducted on the first optical information recording medium 31 (in the present embodiment, HD-DVD 31) of the thickness t1 (0.6 mm) of a protective substrate 31a, the second optical information recording medium 32 (in the present embodiment, DVD 32) of the thickness t2 (0.6 mm) of a protective substrate 32a, and third optical information recording medium 33 (in the present embodiment, CD 33) of the thickness t3 (1.2 mm) of a protective substrate 33a, and it has the interchangeability among 3 kinds of disks.

Hereupon, in FIG. 1, the protective substrate 31a of HD-DVD 31 and the protective substrate 32a of DVD 32 in which the protective substrate thickness t1 and t2 are almost equal, are shown in the same view. Further, in FIG. 2, for convenience sake, HD-DVD 31, DVD 32, and CD 33 are shown in the same view.

Hereupon, in the present invention, the emitted light fluxes from each of light sources may be usable when they satisfy λ1<λ2<λ3, 1.6 λ1≦λ3≦2.2 λ1, and the protective substrate thickness of each optical information recording medium may also be usable when it satisfies 0.8 t1≦t2≦1.2 t1, 1.9 t1≦t3≦2.1 t1.

The optical pick-up apparatus 10 is basically constituted by semiconductor laser light sources (the first-third light sources) 11-13, the first-third collimators 14-16, the first-fourth beam splitters 17-20, a single lens of objective lens 40 (objective optical element) arranged opposed to the information recording surface of each of optical disks, a secondary dimensional actuator (not shown) which moves the objective lens 40 in a predetermined direction, sensor lens 21, diffraction plate 22, and the first-third optical detectors 23-25 for detecting the reflection light from each optical disk.

Hereupon, although it is not shown, it may also be usable that the second optical detector 24 and second light source 12, or the third optical detector 25 and third light source 13 are integrally structured, and a so-called holo-laser unit in which the light flux of wavelength λ2 or λ3 reflected on the information recording surface of DVD 32 or CD 33, reaches the hologram element, following the same optical path as the going path in the returning path, and its advancing path is changed by this hologram element, and it is incident on the optical detector, may also be used. Further, a light source in which a plurality of light sources are integrated (unitized), may also be used.

In the present embodiment, a so-called infinite system is constituted in such a manner that each light flux of wavelength λ1-λ3 is made parallel light by the first-third collimators 14-16, and is incident on the objective lens 40, that is, the optical system magnification m1 to the light flux of wavelength λ1 of the objective lens 40, the optical system magnification m2 to the light flux of wavelength λ2, and the optical system magnification m3 to the light flux of wavelength λ3 are m1=m2=m3=0.

Hereupon, all the light flux of wavelength λ1-λ3 may also be made incident on the objective lens as the divergent light or converging light, in which the optical system magnifications are almost equal.

Because an operation of the optical pick-up apparatus constituted in this manner is well known, a detailed description will be omitted, however, the light flux of wavelength λ1 emitted from the first light source 11 passes the first beam splitter 17, and is made into parallel light in the first collimator 14, and passes the third and fourth beam splitters 19, 20. Then, although a detailed explanation will be described later, on the incident surface 41 of the objective lens 40, the diffractive structure as a diffractive structure 50 is formed, and the light flux of wavelength λ1 is subjected to the refractive action on the incident surface 41 and emitting surface 42 of the objective lens 40, and on the incident surface 41, it is subjected to the diffraction action and emitted.

The light flux emitted from the objective lens 40, is light-converged on the information recording surface of HD-DVD 31, and forms a spot P on the optical axis L. Then, the light flux of wavelength λ1 light-converged on the spot P, is modulated by an information pit on the information recording surface and reflected. The reflected light flux passes again the objective lens 40, fourth and third beam splitters 20, 19, and the first collimator 14, and is reflected on the first beam splitter 17 and diverged.

Then, the diverged light flux of wavelength λ1 is incident on the first optical detector 23 via the sensor lens 21. The first optical detector 23 detects the spot of the incident light and outputs a signal, and by using the outputted signal, a reading signal of the information recorded on HD-DVD 31 is obtained.

Further, the shape change or the total light amount change of the spot on the first optical detector 23 is detected, and focusing or tracking is practiced. According to this detection result, the secondary dimensional actuator moves the objective lens 40 in the focusing direction and tracking direction so that the light flux of wavelength λ1 accurately forms the spot on the information recording surface.

The light flux of wavelength λ2 emitted from the second light source 12 passes the second beam splitter 18, and is made into a parallel light in the second collimator 15, reflected on the third beam splitter 19, passes the fourth beam splitter 20, and reaches the objective lens 40. Then, it is subjected to the refractive action on the incident surface 41 and emitting surface 42 of the objective lens 40, and on the incident surface 41, it is given to the diffraction effect, and is emitted.

Then, the light flux emitted from the objective lens 40 is light-converged on the information recording surface of DVD 32, and forms the spot P on the optical axis L. Then, the light flux of wavelength λ1 light-converged on the spot P, is modulated on the information recording surface by the information pit, and reflected. The reflected light flux passes again the objective lens 40 and the fourth beam splitter 20, and is reflected on the third beam splitter 19 and diverged.

Then, the diverged light flux of wavelength λ2 passes the second collimator 15, and is reflected on the second beam splitter 18 and diverged, and incident on the second optical detector 24 via a sensor lens 21. The following is the same as the light flux of wavelength λ1.

The light flux of wavelength λ3 emitted from the third light source 13 passes the diffraction plate 22 provided in place of a beam splitter, is made to parallel light in the third collimator 16, reflected on the fourth beam splitter 20, and reaches the objected lens 40. Then, it is given to the refraction effect on the incident surface 41 and emitting surface 42, and given to the diffraction effect on the incident surface 41, and is emitted.

The light flux emitted from the objective lens 40 is light-converged on the information recording surface of CD 33, and forms the spot P on the optical axis L. Then, the light flux of wavelength λ3 which is light-converged on the spot P is modulated on the information recording surface by the information pit and reflected. The reflected light flux passes again the objective lens 40, is reflected by the fourth beam splitter 20 and diverged.

Then, the diverged light flux of wavelength λ3 passes the third collimator 16, a course is changed when it passes the diffraction plate 22, and is incident on the third optical detector 25. The following is the same as the light flux of wavelength λ1.

Figure 2:
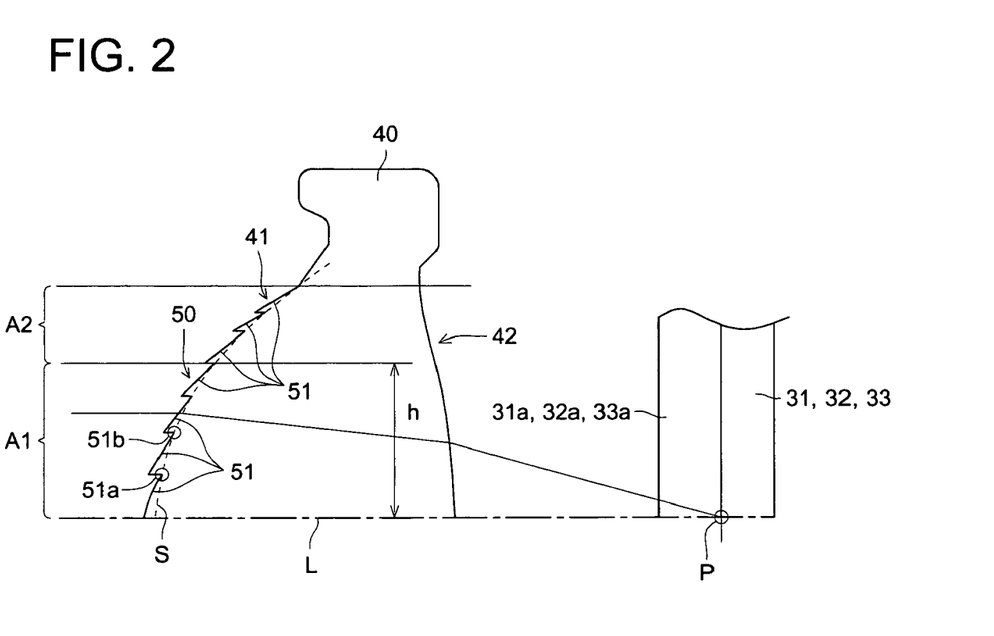
FIG. 2 is a main portion transverse sectional view showing the structure of an objective optical element

As shown in FIG. 2, the objective lens 40 is a plastic single lens whose both surfaces of the incident surface 41 and the emitting surface 42 are aspheric surfaces and convex surfaces.

On almost entire area of the incident surface 51, the diffractive structure 50 is formed, and the emitting surface 52 is a refractive surface.

In the present embodiment, the incident surface 51 is sectioned into a central area A1 which includes the optical axis L and the height from the optical axis L is not larger than h, and a peripheral area A2 in which the height from the optical axis is larger than h and which covers the periphery of the central area A1. The central area A1 is an area corresponding to the numerical aperture NA3 (0.45) of CD 33.

Hereupon, it is preferable that the numerical aperture NA3 of the light-converging spot P by the light flux of wavelength λ3 satisfies $0.44 \leq NA3 \leq 0.49$.

Further, it is preferable that the focal distance f1 to the light flux of wavelength λ1 of the objective lens 40 satisfies $2 \text{ mm} \leq f1 \leq 3.5 \text{ mm}$.

The diffractive structure 50 formed in the central area A1 and the peripheral area A2 is structured by a plurality of diffraction ring-shaped zones 51 which is almost concentric circular around the optical axis L, and those diffraction ring-shaped zones 51 give the diffraction effect to the passing light flux.

Hereupon, because the shape and design method of diffraction ring-shaped zone 51 are well known, the description and drawing are not shown.

Further, although the drawing is not shown, as the diffractive structure 50, a plurality of ring-shaped zone surfaces around the optical axis L may also be structured by a step difference structure which continues through the step difference almost parallel to the optical axis L. Then, it is preferable that the number of diffraction ring-shaped zones 51 or ring-shaped zone surfaces formed in an area (the central area A1 and peripheral area A2) through which the light flux of wavelength λ1 passes, is within a range of 20-100. Thereby, a sufficient diffraction effect can be given to each light flux.

Then, the light fluxes of wavelength λ3 passing the central area A1 are given to the diffraction effect by the diffraction ring-shaped zone 51 of the central area A1, and when, in them, the light flux having a predetermined diffraction order (diffraction order will be described later), forms the light-converging spot on the information recording surface of CD 33, it is used for recording and/or reproducing of the information to CD 33.

On the one hand, the light flux of wavelength λ3 passing the peripheral area A2 is given to the diffraction effect by the diffraction ring-shaped zone 51 of the peripheral area A2 and made to a flare, and does not form the light-converging spot on the information recording surface of CD 33, and is not used for the recording and/or reproducing of the information to CD 33.

Further, the light fluxes of wavelength λ1 and λ2 passing the central area A1 are given to the diffraction effect by the diffraction ring-shaped zone 51 of the central area A1 and when, in them, the diffraction light of a predetermined diffraction order forms the light-converging spot on the information recording surfaces of HD-DVD 31 and DVD 32, they are used for the recording and/or reproducing of the information to HD-DVD 31 and DVD 32.

Further, the light fluxes of wavelength λ1 and λ2 passing the peripheral area A2 are also given to the diffraction effect by the diffraction ring-shaped zone 51 of the peripheral area A2, and when, in them, the diffraction light of a predetermined diffraction order forms the light-converging spot on the information recording surface of HD-DVD 31 and DVD 32, they are used for the recording and/or reproducing of the information to HD-DVD 31 and DVD 32.

Hereupon, it has a color correction function by which the aberration variation amount at the same position in the optical axis L direction, before and after the wavelength variation when the wavelength of the emitted light flux from the first light source 11 is varied by 1 nm from λ1, is corrected to lower than 0.03 λrms by the first collimator 14 and objective lens 40.

In the present invention, the design is made so that the diffraction order of the primary diffraction light having the maximum diffraction efficiency in light fluxes of wavelength $\lambda 1$ passing the central area A1 is an odd number, and the maximum diffraction efficiency E1 of the primary diffraction light of the light fluxes of wavelength $\lambda 1$ passing the central area A1 and the peripheral area A2 is more than 90%.

Herein, normally, because it is a condition that the light flux used for HD-DVD 31 has much light amount (diffraction efficiency is high), there are many cases in which, in the diffraction light of wavelength $\lambda 1$, the diffraction order which has the maximum diffraction efficiency (diffraction order of the primary diffraction light), and a blazed wavelength are selected, and the lens-design is conducted.

However, due to a case where the wavelength of light flux used for HD-DVD 31 is within the range of 350 nm-450 nm, and is about a half of wavelength $\lambda 3$ of the light flux used for CD 33, for example, when n-order diffraction light of wavelength $\lambda 1$ has the maximum diffraction efficiency, the order of the diffraction light (primary diffraction light) having the maximum diffraction efficiency in the diffraction light of the light flux of wavelength $\lambda 3$ is (n/2)-order. Accordingly, in a general optical pick-up apparatus, there are many cases in which, by using the (n/2)-order diffraction light of the light flux of wavelength $\lambda 3$, the reproducing and/or recording of the information is conducted on CD.

Accordingly, for example, when the lens design is conducted so that the 6th-order (even number) diffraction light of the light flux of wavelength $\lambda 1$ passing the central area A1 has the maximum diffraction efficiency, the 3rd-order diffraction light of the light flux of wavelength $\lambda 3$ passing the central area A1 has the maximum diffraction efficiency. Then, by using this 3rd-order diffraction light of wavelength $\lambda 3$, the light amount can be increased in the central area A1.

Then, because the wavelength $\lambda 2$ of DVD 32 is about 1.5 times of wavelength $\lambda 1$ of HD-DVD 31, the diffraction order of the light flux of wavelength $\lambda 2$ having the maximum diffraction efficiency is fourth-order of about ⅔ to that of wavelength $\lambda 1$. Accordingly, when the compatibility is attained by the ratio (6:4:3) of diffraction orders of this wavelength $\lambda 1$, $\lambda 2$, $\lambda 3$, there is a problem that the generation of the spherical aberration on the information recording surface can be suppressed in HD-DVD 31 and DVD 32, however, the large spherical aberration is generated in CD 33.

This is from the following reason in which, when the diffraction order of the primary diffraction light whose diffraction efficiency is the maximum in the diffraction light of wavelength $\lambda 1$ and the blazed wavelength are selected and the diffractive structure is designed, an effect of the diffraction by the diffractive structure (an effect for correcting the spherical aberration) is obtained according to a value in which, from a value in which the wavelength $\lambda 1$ is multiplied by diffraction order, a value in which the wavelength $\lambda 3$ is multiplied by the diffraction order, is subtracted, and in the above example, this value is a value in which $\lambda 3 \times 3$ is subtracted from $\lambda 1 \times 6$. HD-DVD and DVD correct the spherical aberration (spherical aberration of color) generated due to a case where the refractive index of the material is different to each wavelength. In this case, because an absolute value of a value in which $\lambda 3 \times 3$ is subtracted from $\lambda 1 \times 6$ is smaller than a value in which $\lambda 2 \times 4$ is subtracted from $\lambda 1 \times 6$, and a sign is inverse, on the side of CD, the diffraction effect is smaller than DVD, and the spherical aberration acts in the inverse direction to the direction to be corrected. That is, the diffraction efficiency can be increased in CD 33, on the other hand, the diffraction effect can scarcely be obtained comparing to DVD, and the spherical aberration remains.

Accordingly, in the present invention, as described above, the diffraction ring-shaped zone 51 of central area A1 is designed so that the diffraction order of the primary diffraction light having the maximum diffraction efficiency in the light fluxes of wavelength $\lambda 1$ passing the central area A1 is odd number.

In this manner, when the diffraction order of the primary diffraction light of the light flux of wavelength $\lambda 1$ passing the central area A1 is odd number (for example, third order), relating to the light flux of wavelength $\lambda 3$ passing the central area A1, the light amount is dispersed to the first order diffraction light and the second order diffraction light. Accordingly, for example, when the second order diffraction light of the light flux of wavelength $\lambda 3$ is used, by using the effect of diffraction by a value in which $\lambda 3 \times 2$ is subtracted from $\lambda 1 \times 3$ in CD 33, the spherical aberration can be corrected.

Further, a possibility that the diffraction efficiency is lowered by using the first order or second order diffraction light of the light flux of wavelength $\lambda 3$, and the light amount necessary for reproducing and/or recording of the information to CD 33, can not be obtained, is generated, however, to solve this, in the present invention, the output PW3 of the third light source 13 (semiconductor laser light source) emitting the light flux of wavelength $\lambda 3$ is made larger than the output PW1 of the first light source.

Thereby, while the spherical aberration of CD 33 is kept down to a degree in which practically no trouble is generated, the sufficient light amount can be preserved, and the light flux of wavelength $\lambda 3$ can be used for recording and/or reproducing of the information to CD 33.

Hereupon, the optical pick-up apparatus 10 may also be designed so that the focal distance fc1 to the light flux of wavelength $\lambda 1$ of the first collimator 14 and the focal distance fc3 to the light flux of wavelength $\lambda 3$ of the third collimator 16 satisfy fc1>fc3. Thereby, a distance from the third light source 13 to the third collimator 16 is shorter than a distance from the first light source 11 to the first collimator 14, and an amount of the light flux of wavelength $\lambda 3$ passing the third collimator 16 is larger than that of the light flux of wavelength $\lambda 1$ passing the first collimator 14, and the same effect as that the output PW3 is made larger than the output PW1, can be obtained. Further, the focal distance fc1 and the focal distance fc2 to the light flux of wavelength $\lambda 2$ of the second collimator 15 may also satisfy fc1>fc2.

Further, a structure by which the lowering of light amount on the CD 33 side is compensated for, may also be applied by increasing the sensor sensibility of the third optical detector 25, or improving the signal processing.

Hereupon, it is preferable that the diffractive structure is designed so that the maximum diffraction efficiency E3 of the light flux of wavelength $\lambda 3$ satisfies $30\% \leq E3 \leq 80\%$, furthermore, it is preferable that it satisfies $30\% \leq E3 \leq 60\%$.

Further, it is preferable that the diffraction order n3 of the diffraction light having the diffraction efficiency E3 satisfies n3≧n1/2. For example, when n1=3, as the light flux of wavelength λ3, although any one of the first order diffraction light and the second order diffraction light can be selected, the number of order to satisfy n3≧n1/2 is the second order.

Further, as a combination (n1, n3) of n1 and n3, it is preferable that it is (3, 2) or (5, 2).

Further, in at least one of the first -third collimators 14-16, the saw-toothed shape diffraction ring-shaped zone 51 same as that provided on the objective lens 40, or the ring-shaped zone surface having the step difference structure which continues through a plurality of step differences almost parallel to the optical axis direction may be provided, in this case, it is preferable that the number of diffraction ring-shaped zones 51 formed in the range through which the light flux of wavelength λ1 passes, or the number of ring-shaped zone surfaces is within a range of 50-100.

Further, the first-third collimators 14-16 are not provided, and for example, a structure may also be applied in which one collimator is arranged in a common optical path through which all of light fluxes of wavelengths λ1-λ3 or any 2 kinds of light fluxes pass together.

Figure 3:
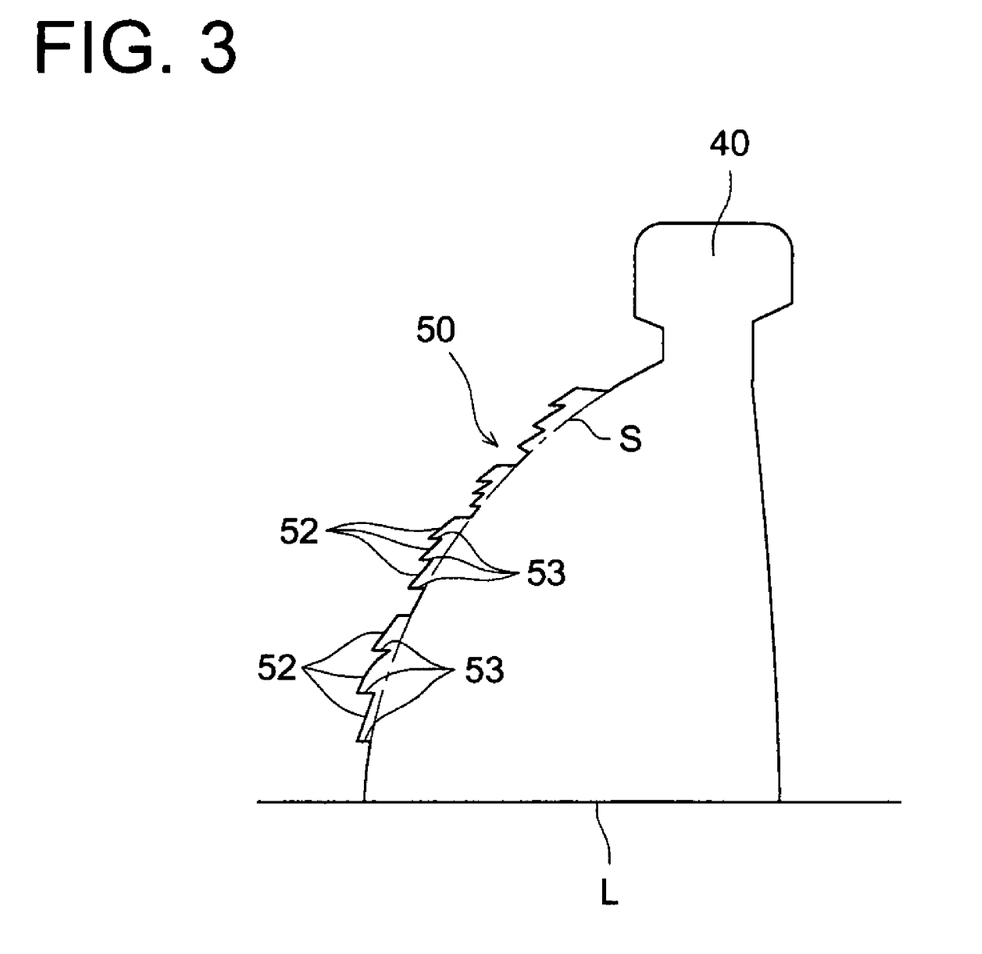
FIG. 3 is a main portion transverse sectional view showing the structure of an objective optical element

Further, as a diffractive structure 50, for example, it may also be a structure as shown in FIG. 3. The diffractive structure 50 shown in FIG. 3 is structured by a plurality of step difference structures in which a plurality of ring-shaped zone surfaces 52 around the optical axis L are continued through the step difference 53 almost parallel to the optical axis L.

Each ring-shaped zone surface 52 is formed in such a manner that, as it is separated from the optical axis L, it is protruded to the light source side (forward), and when a predetermined optical path difference is given to the light flux incident on each ring-shaped zone surface 52, the phase difference is generated in each light flux, and as a result, the phases of light fluxes which passed each ring-shaped zone surface 52 are almost complete on the information recording surface. Hereupon, the shape of each step difference 53 can be regulated by a displacement value in the optical axis L direction to the macroscopic aspheric surface S.

Further, the diffractive structure 50 may also be provided on any one of the incident surface 41 and the emitting surface 42 of the objective lens 40, or both surfaces.

Further, as HD-DVD 31, so-called 2-layer disk which is structured by laminating the protective substrate 31a of thickness t1, the first information recording surface, intermediate layer, and the second information recording surface, in order from the light source side to the optical axis L direction, may also be used.

EXAMPLES

Example 1

Next, the example 1 will be described.

In the present example, an incident surface and a emitting surface of the objective lens are respectively aspheric surface shape, and the incident surface and the emitting surface are respectively divided into the central area and the peripheral area, and a plurality of diffraction ring-shaped zones whose sectional shape around the optical axis as the diffractive structure is saw-toothed shape, are formed. Hereupon, the number of diffraction ring-shaped zones formed on the incident surface of the objective lens is 44.

Further, a collimator is arranged in a common optical path on which the light fluxes of wavelengths λ1 and λ2 pass together, and also on the incident surface of the collimator, a plurality of diffraction ring-shaped zones whose sectional shape around the optical axis L is saw-toothed shape, are formed.

Each light flux of wavelengths λ1-λ3 which passed the central area, forms a light-converging spot on the information recording surface of each optical disk.

Lens data of the collimator and objective lens are shown is Table 1 and Table 2.

TABLE 1

Example 1 lens data
Optical system magnification     m1: 6.00 m2: 5.98
Collimator diffraction order number   n1: 5 n2: 3
Focal distance of objective lens   f1: 3.1 mm, f2: 3.11 mm, f3: 3.17 mm
Image surface side numerical aperture  NA1: 0.65, NA2: 0.65, NA3: 0.51
Diffraction order number      n1: 3, n2: 2, n3: 2
Magnification              m1: 0, m2: 0, m3: 0

| i-th surface | Ri | di (407 nm) | ni (407 nm) | di (655 nm) | ni (655 nm) | di (785 nm) | ni (785 nm) |
|---|---|---|---|---|---|---|---|
| 0 |  | 17.36 |  | 17.99 |  | ∞ |  |
| 1 | ∞ | 1.0 | 1.559806 | 1.0 | 1.540725 |  |  |
| 2 | −31.4555 | 5.0 |  | 5.0 |  |  |  |
| 3 (stop diameter) | ∞ | 0.1 (φ3.90 mm) |  | 0.1 (φ4.03 mm) |  | 0.1 (φ3.14 mm) |  |
| 4 | 1.82682 | 1.850000 | 1.559806 | 1.850000 | 1.540725 | 1.850000 | 1.537237 |
| 4' | 1.90950 | −0.013374 |  | −0.013374 |  | −0.013374 |  |
| 5 | −8.33517 | 1.60 |  | 1.70 |  | 1.38 |  |
| 5' | −7.49045 | 0.00 |  | 0.00 | 1.0 | 0.00 | 1.0 |
| 6 | ∞ | 0.60 | 1.61869 | 0.60 | 1.57752 | 1.20 | 1.57063 |
| 7 | ∞ |  |  |  |  |  |  |

* di expresses a displacement from the i-th surface to the (i + 1)th surface. (However, d4', d5' show a displacement to the fourth surface, fifth surface.)

TABLE 2

Aspheric surface data

The second surface

Aspheric surface coefficient

| | |
|---|---|
| κ | −9.5013 × E+1 |
| A4 | +6.6825 × E−4 |
| A6 | +1.2829 × E−4 |

Optical path difference function

| | |
|---|---|
| C2 | −9.2752 |
| C4 | −2.7422 × E−1 |
| C6 | −3.8258 × E−2 |
| C8 | +2.2697 × E−3 |
| C10 | −2.4255 × E−4 |

The fourth surface (1.615 mm > h)

Aspheric surface coefficient

| | |
|---|---|
| κ | −3.5170 × E−1 |
| A4 | −2.4690 × E−3 |
| A6 | −3.4573 × E−3 |
| A8 | +7.5819 × E−4 |
| A10 | −5.8829 × E−5 |
| A12 | −4.9359 × E−5 |
| A14 | +6.8609 × E−6 |

Optical path difference function

| | |
|---|---|
| C2 | +7.0550 |
| C4 | +3.7839 × E−1 |
| C6 | −8.9431 × E−1 |
| C8 | +3.1953 × E−1 |
| C10 | −4.8855 × E−2 |

The 4'-th surface (1.615 mm ≦ h)

Aspheric surface coefficient

| | |
|---|---|
| κ | −2.8592 × E−1 |
| A4 | −2.3842 × E−3 |
| A6 | −1.6075 × E−3 |
| A8 | +5.4180 × E−4 |
| A10 | −1.1660 × E−4 |
| A12 | −8.5344 × E−6 |
| A14 | −2.4195 × E−6 |

Optical path difference function

| | |
|---|---|
| C2 | +6.1045 |
| C4 | +7.1422 × E−1 |
| C6 | −7.9784 × E−1 |
| C8 | +2.4038 × E−1 |
| C10 | −3.0377 × E−2 |

The fifth surface (1.259 mm > h)

Aspheric surface coefficient

| | |
|---|---|
| κ | −1.4549 × E+2 |
| A4 | −1.0700 × E−2 |
| A6 | +1.1660 × E−2 |
| A8 | −5.6895 × E−3 |
| A10 | +1.4413 × E−3 |
| A12 | −1.2426 × E−4 |
| A14 | +1.7019 × E−6 |

The 5'-th surface (1.259 mm ≦ h)

Aspheric surface coefficient

| | |
|---|---|
| κ | −1.8085 × E+2 |
| A4 | −1.2564 × E−2 |
| A6 | +1.2817 × E−2 |
| A8 | −5.0936 × E−3 |
| A10 | +8.8543 × E−4 |
| A12 | −6.6527 × E−5 |
| A14 | +2.5498 × E−6 |

As shown in Table. 1, the optical pick-up apparatus of the present invention is set into the focal distance f1=3.10 mm when the wavelength λ1 emitted from the first light source=407 nm, the image side numerical aperture NA1=0.65, and image-formation magnification m1=0, and into the focal distance f2=3.11 mm when the wavelength λ2 emitted from the second light source 12=655 nm, the image side numerical aperture NA2=0.65, image-formation magnification m2=0, and into the focal distance f3=3.17 mm when the wavelength λ3 emitted from the third light source=785 nm, the image side numerical aperture NA3=0.51, and image-formation magnification m3=0.

Further, the third order (odd number) diffraction light of the light flux of wavelength λ1 having the maximum diffraction efficiency is used, and corresponding to this, the secondary diffraction light of the light fluxes of wavelengths λ2 and λ3 is used. Further, the diffraction effect is given by the objective lens, to the fifth order diffraction light of the light flux of wavelength λ1 and the third order diffraction light of the light flux of wavelength λ2, which are given to the diffraction effect by the diffractive structure provided in the collimator. Further, the magnification m1 to the light flux of wavelength λ1 of the collimator=6.00, and magnification m2 to the light flux of wavelength λ2=5.98.

The surface number 2 in Table 1 shows the incident surface of the collimator, the surface numbers 4 and 4' show the central area A1 and the peripheral area A2 of the incident surface of the objective lens 40, and surface numbers 5 and 5' show the central area A1 and the peripheral area A2 of the emitting surface of the objective lens 40. Further, ri represents the radius of curvature, di represents the position of the optical axis L direction from the i-th surface to the (i+1)-th surface, and ni represents the refractive index of each surface.

The second surface, fourth surface, 4'-th surface, fifth surface, and 5'-th surface are respectively formed into aspheric surfaces which are axi-symmetrical around the optical axis L, regulated by a mathematical expression in which coefficients shown in Table 1 and Table 2 are substituted into the following expression (arith-1).

[Arith-1]

Aspheric Surface Shape Equation $$X(h) = \frac{(h^2/r)}{1+\sqrt{1-(1+\kappa)(h/r)^2}} + \sum_{i=0}^{n} A_{2i} h^{2i}$$

Herein, $X(h)$ is an axis in the optical axis L direction (advancing direction of the light is defined to be positive), κ is conical coefficient, $A_{2i}$ is an aspheric surface coefficient.

Further, the optical path length given to the light flux of each wavelength by the diffraction ring-shaped zone is regulated by the mathematical expression in which the coefficients shown in Table 2 are substituted into the optical path difference function of (Arith-2).

(Arith-2)

Optical Path Difference Function $$\Phi(h) = \left(n \times \frac{\lambda}{\lambda_B}\right) \times \sum_{i=0}^{5} C_{2i} h^{2i}$$

n: diffraction order
λ: wavelength
$\lambda_B$: blazed wavelength

Herein, $C_{2i}$ is a coefficient of the optical path difference function, and blazed wavelength $\lambda_B=1$ mm.

Figure 4:
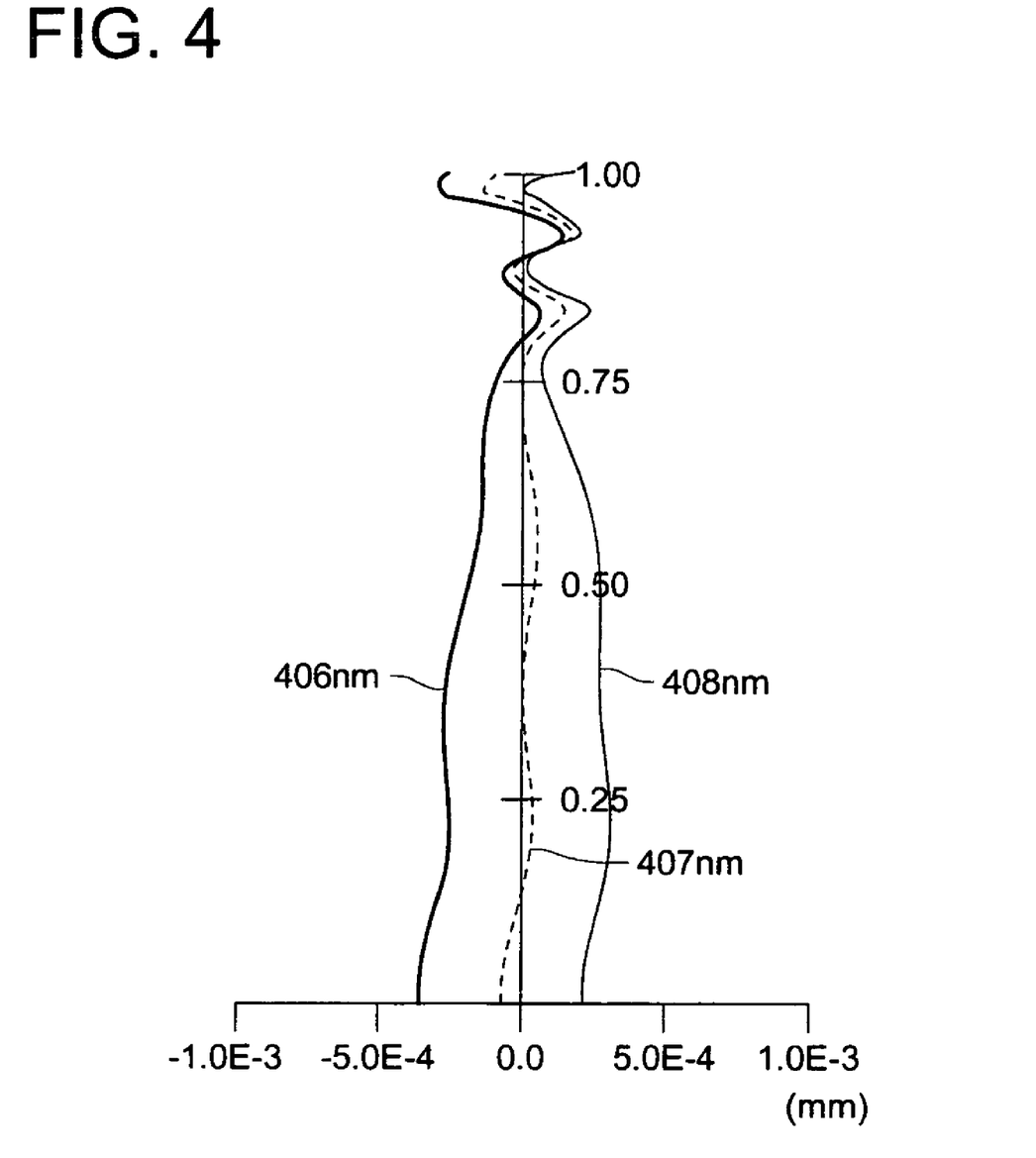
FIG. 4 is a graph showing a variation amount of a wave-front aberration

FIG. 4 shows a variation amount of the wave-front aberration at the time of mode-hop of the light flux of wavelength λ1. Normally, because the wavelength variation amount at the time of mode-hop is about 1 μm, in this range (406 nm-408 nm), the variation amount of the wave-front aberration is kept not larger than 0.07 λrms which is a diffraction limit, and it can be seen that it has a sufficient color correction function for HD-DVD.

Figure 5:
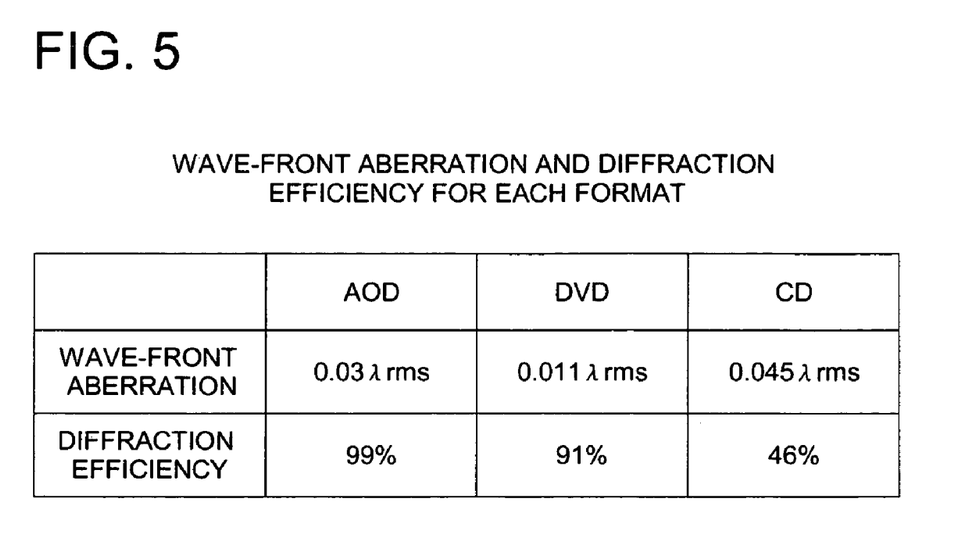
FIG. 5 is a graph showing a wave-front aberration and diffraction efficiency.

Further, FIG. 5 shows the wave-front aberration and the diffraction efficiency of each light flux of wavelength λ1 (HD-DVD), wavelength λ2 (DVD), wavelength λ3 (CD). From FIG. 5, it can be confirmed that the diffraction efficiency E1 of the light flux of wavelength is more than 90%, and it can be seen that the wave-front aberration of each light flux is suppressed lower than 0.07 λrms which is a diffraction limit, and it has a sufficient color correction function. Further, it can be seen that it has a sufficient diffraction efficiency for using for recording and/or reproducing of the information to each optical information recording medium.

EFFECTS OF THE INVENTION

According to present invention, the optical pick-up apparatus which has interchangeability of HD-DVD with the other 2 kinds of optical information recording media, and in which the light amount securement and spherical aberration correction are compatible, can be obtained.

What is claimed is:

1. An optical pick-up apparatus comprising:
   a first light source emitting a first light flux having a wavelength of λ1, the first light flux being utilized for recording information on and/or reproducing from a first optical information recording medium including a first protective substrate having a thickness of t1;
   a second light source emitting a second light flux having a wavelength of λ2, which is greater than λ1, the second light flux being utilized for recording information on and/or reproducing from a second optical information recording medium including a second protective substrate having a thickness of t2, which satisfies $0.8t1 \leq t2 \leq 1.2t1$;
   a third light source emitting a third light flux having a wavelength of λ3, which satisfies $1.6\lambda1 \leq \lambda3 \leq 2.2\lambda1$ and λ3>λ2, the third light flux being utilized for recording information on and/or reproducing from a third optical information recording medium including a third protective substrate having a thickness of t3, which $1.9t1 \leq t3 \leq 2.1t1$; and
   an objective optical element having a diffractive structure on an optical surface of the objective optical element,
   wherein a diffraction efficiency E1 of a first primary diffractive ray, which has the greatest diffraction efficiency among diffractive rays generated by the first light flux passing through the diffractive structure, is not less than 90%,
   a diffraction order n1 of the first primary diffractive ray is an odd number, and
   an output power PW3, which is an output power of the third light source when the third light source emits the third light flux, is emitted is greater than an output power PW1, which is an output power of the first light source when the first light source emits the first light flux.

2. The optical pick-up apparatus of claim 1, wherein when an optical magnification of the objective optical element to the first light flux is represented by m1, an optical magnification of the objective optical element to the second light flux is represented by m2, and an optical magnification of the objective optical element to the third light flux is represented by m3, each of m1, m2 and m3 has an approximately same value.

3. The optical pick-up apparatus of claim 1, wherein a diffraction efficiency E3 of a third primary diffractive ray, which has the greatest diffraction efficiency among diffractive rays generated by the third light flux passing through the diffractive structure, satisfies the following relation:

$$30\% \leq E3 \leq 80\%.$$

4. The optical pick-up apparatus of claim 3, wherein E3 satisfies the following relation:

$$30\% \leq E3 \leq 60\%.$$

5. The optical pick-up apparatus of claim 3, wherein a diffractive order n3 of the third primary diffractive ray and n1 satisfy the following relation:

$$n3 \geq n1/2.$$

6. The optical pick-up apparatus of claim 5, wherein the following relation is satisfied:

$$(n1, n3)=(3, 2) \text{ or } (n1, n3)=(5, 2).$$

7. The optical pick-up apparatus of claim 1, wherein a focus length f1 of the objective optical element to the first light flux satisfies the following relation:

$$2 \text{ mm} \leq f1 \leq 3.5 \text{ mm}.$$

8. The optical pick-up apparatus of claim 1, wherein a numerical aperture NA3 of a converged spot of the third light flux satisfies the following relation:

$$0.44 \leq NA3 \leq 0.49.$$

9. The optical pick-up apparatus of claim 1, wherein the diffractive structure comprises plural diffraction ring zones centering around an optical axis of the objective optical element, and a cross-sectional shape of the diffractive structure is a saw-tooth shape.

10. The optical pick-up apparatus of claim 9, wherein the number of the diffractive ring zones provided in a region where the first light flux passing through is 20 to 100.

11. The optical pick-up apparatus of claim 1, wherein the diffractive structure comprises plural ring-shaped zone surfaces centering around an optical axis of the objective optical element, and each of the ring-shaped zone surfaces includes plural step structures, which continue through a step difference approximately parallel to the optical axis.

12. The optical pick-up apparatus of claim 11, wherein the number of ring-shaped zone surfaces provided in a region where the first light flux passing through is 20 to 100.

13. The optical pick-up apparatus of claim 1, further comprising a collimator,
   wherein a focus length fc1 of the collimator to the first light flux and focus length fc3 of the collimator to the third light flux satisfy the following relation:

$$fc1 > fc3.$$

14. The optical pick-up apparatus of claim 1, further comprising a collimator, wherein a focus length fc1 of the collimator to the first light flux and a focus length fc2 of the collimator to the second light flux satisfy the following relation:

$fc1 > fc2$.

15. The optical pick-up apparatus of claim 1, further comprising a collimator, wherein the objective optical element and the collimator make an aberration variation at a same position in an optical axis direction not more than 0.03 λrms in case the wavelength of the first light flux varies 1 nm from λ1.

16. The optical pick-up apparatus of claim 15, wherein the collimator has a diffractive structure on an optical surface of the collimator, the diffractive structure comprises plural diffraction ring zones centering around an optical axis of the collimator, and a cross-sectional shape of the diffractive structure is a saw-tooth shape, wherein the number of the diffraction ring zones provided in a region where the first light flux passing through is 50 to 100.

17. The optical pick-up apparatus of claim 15, wherein the collimator has plural ring-shaped zone surfaces centering around an optical axis of the collimator, and each of the ring-shaped zone surfaces includes plural step structures, which continue through a step approximately parallel to the optical axis, and wherein the number of the ring-shaped zone surfaces provided in a region where the first light flux passing through is 50 to 100.

18. The optical pick-up apparatus of claim 1, further comprising a collimator, wherein the first light flux and the second light flux pass through the collimator.

19. The optical pick-up apparatus of claim 1, wherein the objective optical element is made of a plastic material.

20. The optical pick-up apparatus of claim 1, further comprising a collimator, wherein the collimator is made of a plastic material.

21. The optical pick-up apparatus of claim 2, wherein each of the optical magnifications m1, m2 and m3 is approximately zero.

* * * * *